United States Patent
Renze et al.

(10) Patent No.: US 6,378,926 B1
(45) Date of Patent: Apr. 30, 2002

(54) TRUCK BED EXTENDER

(76) Inventors: Rick Renze, 14437 Cedar Springs Dr., Whittier, CA (US) 90603; Ed Stinson, 2232 Meyer Pl., Costa Mesa, CA (US) 92627

( * ) Notice: Subject to any disclaimer, the term of this patent is extended or adjusted under 35 U.S.C. 154(b) by 0 days.

(21) Appl. No.: 09/753,578

(22) Filed: Jan. 4, 2001

(51) Int. Cl.[7] ................................................ B62C 1/06
(52) U.S. Cl. .................... 296/26.11; 296/97.1; 296/183
(58) Field of Search ............................ 296/26.11, 57.1, 296/183

(56) References Cited

U.S. PATENT DOCUMENTS

| | | | |
|---|---|---|---|
| 2,872,239 A | | 2/1959 | Bowness et al. |
| 4,472,639 A | | 9/1984 | Bianchi |
| 4,531,773 A | * | 7/1985 | Smith .......................... 296/26 |
| D291,789 S | | 9/1987 | Noga |
| 4,778,213 A | * | 10/1988 | Palmer ......................... 296/26 |
| 5,169,202 A | * | 12/1992 | Cupp et al. ................. 296/57.1 |
| 5,468,038 A | | 11/1995 | Sauri |
| 5,478,130 A | * | 12/1995 | Matulin et al. ............ 296/57.1 |
| 5,658,033 A | * | 8/1997 | Delaune ....................... 296/26 |
| 5,741,039 A | * | 4/1998 | Habdas ...................... 296/57.1 |
| 5,752,800 A | | 5/1998 | Brincks et al. |
| 5,755,480 A | * | 5/1998 | Bryan ........................... 296/26 |
| 5,765,892 A | * | 6/1998 | Covington .................... 296/26 |
| 5,775,759 A | * | 7/1998 | Cummins ..................... 296/26 |
| 5,788,311 A | | 8/1998 | Tibbals |
| 5,806,907 A | * | 9/1998 | Martinus et al. ......... 296/26.11 |
| 5,857,724 A | | 1/1999 | Jarman |
| 5,902,000 A | * | 5/1999 | Wold ............................ 296/26 |
| 5,975,608 A | * | 11/1999 | Jarman ..................... 296/26.11 |
| D418,106 S | | 12/1999 | Leitner et al. |
| 6,007,127 A | | 12/1999 | Garofalo |
| 6,019,410 A | | 2/2000 | Trostle et al. |
| 6,120,076 A | * | 9/2000 | Adsit et al. ............... 296/26.11 |
| 6,142,548 A | * | 11/2000 | Kuhn et al. ................ 296/26.1 |
| 6,155,622 A | * | 12/2000 | Reed .......................... 296/57.1 |
| 6,193,294 B1 | * | 2/2001 | Disner et al. ............ 296/26.11 |

FOREIGN PATENT DOCUMENTS

CA          1 244 858          11/1988

* cited by examiner

*Primary Examiner*—Ken Patel
(74) *Attorney, Agent, or Firm*—Richard C. Litman

(57) ABSTRACT

A truck bed extender apparatus for increasing the load capacity of a pickup truck comprising four hinged basic elements including a pair of side panels, a tailgate and a platform that is secured to the tailgate of the truck. The side panels are removably secured to the inside surfaces of the truck bed walls by a key latch mechanism. The assembly can be folded by folding the side panels inward and rotating the assembly 270° down for loading or unloading the truck bed.

10 Claims, 2 Drawing Sheets

TRUCK BED EXTENDER

BACKGROUND OF THE INVENTION

1. Field of the Invention

The present invention relates generally to truck bed extensions. More specifically, the invention is a truck bed keeper for extending the bed of a pickup truck to provide more cargo space.

2. Description of the Related Art

The prior art describes various truck bed extenders, but none discloses the present invention. There is a need for a durable and foldable truck bed extender apparatus which can be kept attached to the truck's tailgate when loading or unloading. The related art will be discussed in the order of perceived relevance to the present invention.

U.S. Pat. No. 6,007,127, issued on Dec. 28, 1999 to Mary Ann Garofalo, describes a tailgate cargo container comprising a three-panel attachment including a middle panel having a raised border and strap hinged to the tailgate which is supported by side chains to the bed of the truck. Two side panels are strap hinged to the tailgate and must leave a space between them and the vehicle's sidewalls. Each side panel has a slot for engaging a headed pin extending inward from the side borders of the middle panel to latch the side panels to the middle panel to cover the side panels upon folding over the tailgate. The tailgate cargo container is distinguishable for being limited to its three-section and folding structure.

U.S. Pat. No. 5,857,724, issued on Jan. 12, 1999 to E. Robert Jarman, describes a three-panel apparatus for extending a vehicle cargo area comprising a main panel piano hinged to the tailgate and supported by two strut braces which can be released to rotate the main panel down. Two hinged and folding side panels to the main panel. The main panel has a top extended portion which includes a locking spring which presses into a trough in the side panels for locking them against the main panel. The main panel also has the extended portion interfitting in a trough in the tailgate adjacent the tailgate's hinge to the truck bed. The apparatus is distinguishable for requiring modifications in the tailgate to accommodate the extended portions of the main panel and side panels.

U.S. Pat. No. 4,472,639, issued on Sep. 18, 1984 to Barry E. Bianchi, describes a retractable attachment for extending the tailgate for a pickup truck comprising three panels which are connected by three one-way opening hinges with leaves to form a three-sided box. The side panels are each secured to the sidewalls of the truck bed by a U-shaped spring clip held in a bracket attached to a threaded bolt traversing the sidewall and secured by a nut exposed in the stake passage. The tailgate attachment is distinguishable for lacking a tailgate base panel element and requiring one-way hinges with leaves which do not permit rotation of the folded attachment downward.

Canada Patent No. 1 244 858, issued on Nov. 15, 1988 to Joseph J. Kardos, describes a tailgate capable of extending a truck box comprising only three panels, wherein the side panels are hinged to the end panel and the end panel is double hinged to the truck's tailgate. The side panels are attached to the truck's sidewalls by a U-shaped member, bracket and a U-shaped clip. The end panel requires a mounting plate to attach the double hinge to the end panel. The extendible truck box is distinguishable for its three panel construction.

U.S. Pat. No. 6,019,410, issued on Feb. 1, 2000 to Mark C. Trostle et al., describes a fold out bed extender for a motor vehicle comprising a rear panel, a first set and a second set of swing panels articulable from a stowed position to an operable position. Each set of swing panels has a leading panel, a trailing panel and a hinge connecting them by pins passing through a series of eyelets. Each leading panel is pivotally attached to the vehicle's bed, and each trailing panel is detachably coupled to the rear panel by the same pin and eyelet connections. The rear panel is hinged to the tailgate. The bed extender is distinguishable for separating the swing panels from the rear panel which folds over the tailgate.

U.S. Pat. No. 2,872,239, issued on Feb. 3, 1959 to George W. Bowness et al., describes a vehicle body extension comprising an end panel hinged to two side panels and hinged to the end of the tailgate. The side panels fold inward and the end panel folds on the tailgate. The tailgate must be modified to include the hinge for the end panel. The box body is distinguishable for requiring a hinge modification of the tailgate.

U.S. Design Pat. No. 291,789, issued on Sep. 8, 1987 to Robert A. Noga, describes a truck bed extension comprising a limited end panel supported by two upright posts positioned on the tailgate. A pair of support rods attach the rotatable upright posts to the sides of the pickup truck bed leaving open sides. The cargo bed extender is distinguishable for its limited coverage.

U.S. Design Pat. No. 418,106, issued on Dec. 28, 1999 to Horst Leitner et al., describes a vehicle cargo bed extender comprising a fence structure with three arcuate horizontal bars and six posts attached to the open tailgate and the sides of the pickup truck. The cargo bed extender is distinguishable for its fence structure.

U.S. Pat. No. 5,468,038, issued on Nov. 21, 1995 to Gregory M. Sauri, describes a vehicle tailgate extender comprising an extension member retractably mounted between inner and outer tailgate walls. The extension member is movable between operative and stowed positions, wherein the stowed position of the extension members is entirely closed by the tailgate walls. In the operative position, the extension member extends from an opening in a top surface of the tailgate located intermediate the tailgate walls. The tailgate extender is distinguishable for its open structure.

U.S. Pat. No. 5,788,311, issued on Aug. 4, 1998 to Kerry W. Tibbals, describes a combination step and cargo space extender apparatus comprising a foldable ramp comprising a housing assembly having a chassis assembly slidingly engaged with the housing assembly, and a step assembly rotatably connected to the chassis assembly. The combination bed extender is distinguishable for requiring a step assembly.

U.S. Pat. No. 5,752,800, issued on May 19, 1998 to Darryl Brincks et al., describes a combination pickup truck bed extender-foldable ramp comprising collapsible sections attached to the tailgate for loading small machinery from the ground. The ramp is distinguishable for its different collapsible construction.

None of the above inventions and patents, taken either singularly or in combination, is seen to describe the instant invention as claimed. Thus, a truck bed extender solving the aforementioned problems is desired.

SUMMARY OF THE INVENTION

The present invention is directed to a truck bed keeper apparatus for extending the bed of a pickup truck to provide more cargo space. The additional tailgate system has two side panels hingedly attached to a gate panel which is hinged to a bed panel to create a secondary tailgate and sidewalls for providing more cargo space. The panels are held in their upright positions by pin locks and removably attached to the sides of the truck bed by adjustable latch brackets. When loading the truck bed, the side panels are folded on the secondary tailgate which rotates 270° down from the primary tailgate. The panels fold down against the tailgate when not in use. The panels are vacuum formed polyethylene reinforced with aluminum parts. A removable plastic panel can be attached to the outside surface of the long panel for the placement of placards or advertising signs.

Accordingly, it is a principal object of the invention to provide a foldable extension for a bed of a pickup truck.

It is another object of the invention to provide a foldable extension for a bed of a pickup truck having four hinged panels.

It is a further object of the invention to provide a foldable extension for a bed of a pickup truck having four hinged panels including two side panels which fold against a tailgate panel.

Still another object of the invention is to provide a foldable extension for a bed of a pickup truck including a bed panel hinged to the tailgate panel.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWING

Similar reference characters denote corresponding features consistently throughout the attached drawings.

DETAILED DESCRIPTION OF THE PREFERRED EMBODIMENT

The present invention provides a truck bed extender apparatus which can be removably attached to the tailgate portion of a truck and when folded can be permitted to remain attached within the truck bed or extended below an open tailgate.

Figure 1:
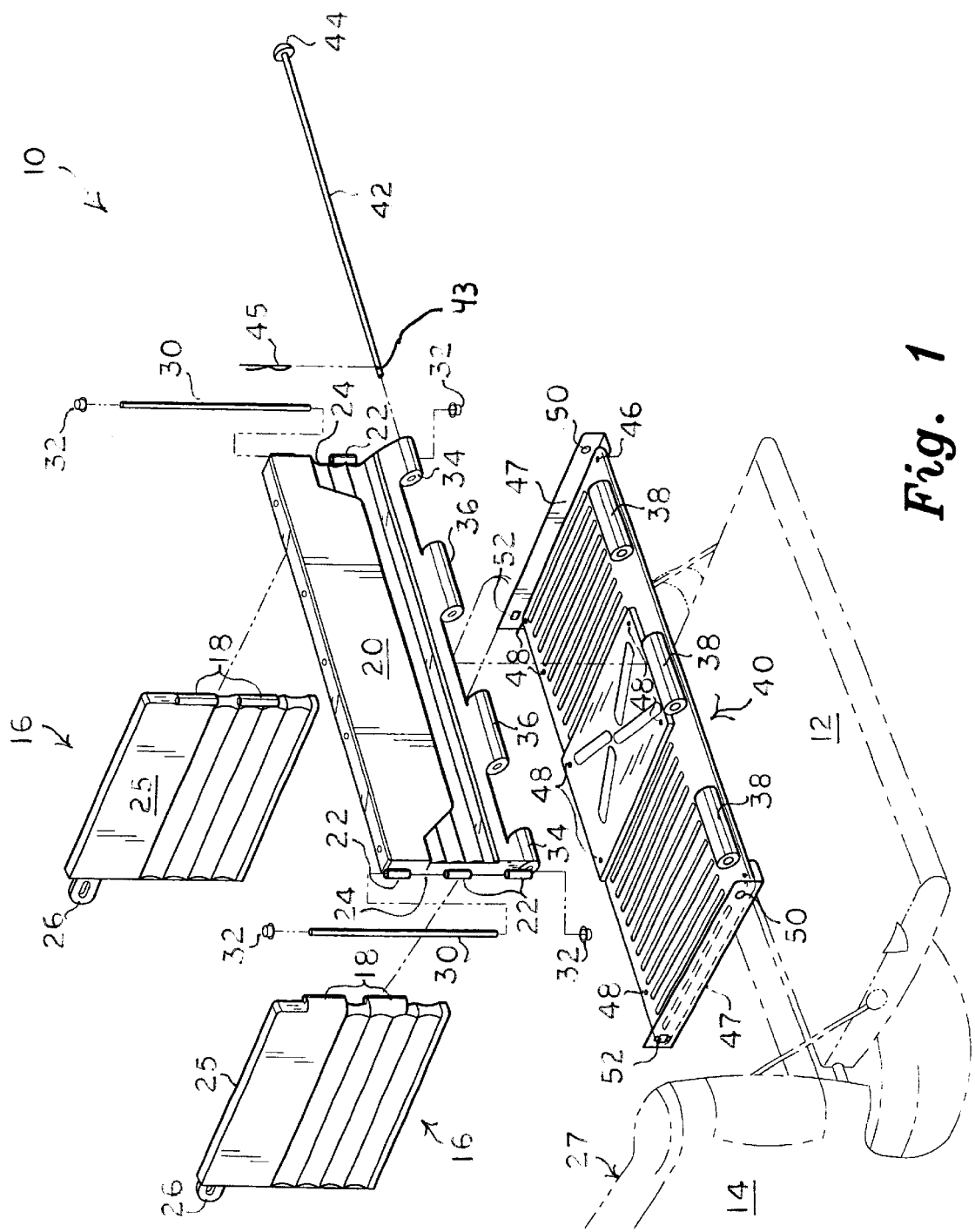
FIG. 1 is an exploded environmental perspective view of a truck bed extender apparatus on a truck bed (shown in shadow) according to the present invention.

In FIG. 1, a truck bed extender apparatus 10 is illustrated in an exploded manner disposed on an open tailgate 12 (in shadow) of a pickup truck 14 (in shadow). The apparatus 10 comprises a pair of side panel elements 16 having a pair of apertured connecting lugs 18 on each proximate edge and a recessed planar metal arm 25 having an apertured latch plate 26 on a distal edge for locking with a rotatable key latch 28 (FIG. 2) attached to the inside wall 27 of the bed of a pickup truck 14.

A rectangular tailgate element 20 has three apertured lugs 22 on each vertical side separated by recessed regions 24 sized and dimensioned to receive the lugs 18 of each side panel element 16. Thus, a pair of vertical steel rods 30 having threaded or frictionally fitting caps 32 are inserted through the apertures defined in the lugs 18 to integrate the tailgate element 20 with the side panel elements 16, forming a hinge with the caps 32 retaining the rods 30 in the hinge. The caps 32 have a flange extending radially about their circumference so that the lower caps 32 can be seated in apertures 46 in the platform or tailgate liner element 40.

The platform element 40 is commensurate in area to the existing tailgate 12, and secured to tailgate 12 by fasteners in spaced peripheral holes 48. The rods 30 are axially aligned in apertures 46 when side panels 16 are rotated about the hinges. The bottom region of the tailgate element 20 has two outside apertured short lugs 34 and two longer central lugs 36 for cooperating with three spaced lugs 38 in the outside region of the tailgate platform element 40 by insertion of an elongated steel rod 42 having a head 44 and an opposite end with an aperture 43 for a cotter pin 45. The platform or tailgate liner element 40 has angle brackets 47 at each end having an aperture 50 at the outside end for securing the steel rod 42 and the tailgate element 20, and retaining springs 52 at the inside end for retaining the tailgate element 20 against the tailgate liner element 40 when the tailgate 12 is closed.

Thus, the side panel elements 16 are secured to the truck bed wall 27 by latches 28 to provide a secure extension to the pickup truck 14 when the truck bed extender 10 is deployed to increase the cargo carrying capacity of the pickup truck 14. When the truck bed extender 10 is not in use, the latches 28 are unhooked and the side panel elements 16 are rotated about the hinges defined by rods 30 and lugs 18 and 22 and retained flat against tailgate element 20 by snap-fitting the apertures in latch plates 26 onto projections (not shown) defined on tailgate element 20, and then rotating tailgate element 20 towards tailgate line element 40 until tailgate element 20 is retained by springs 52. Tailgate 12 may then be closed, leaving the bed of the pickup truck 14 at its original size.

Figure 2:
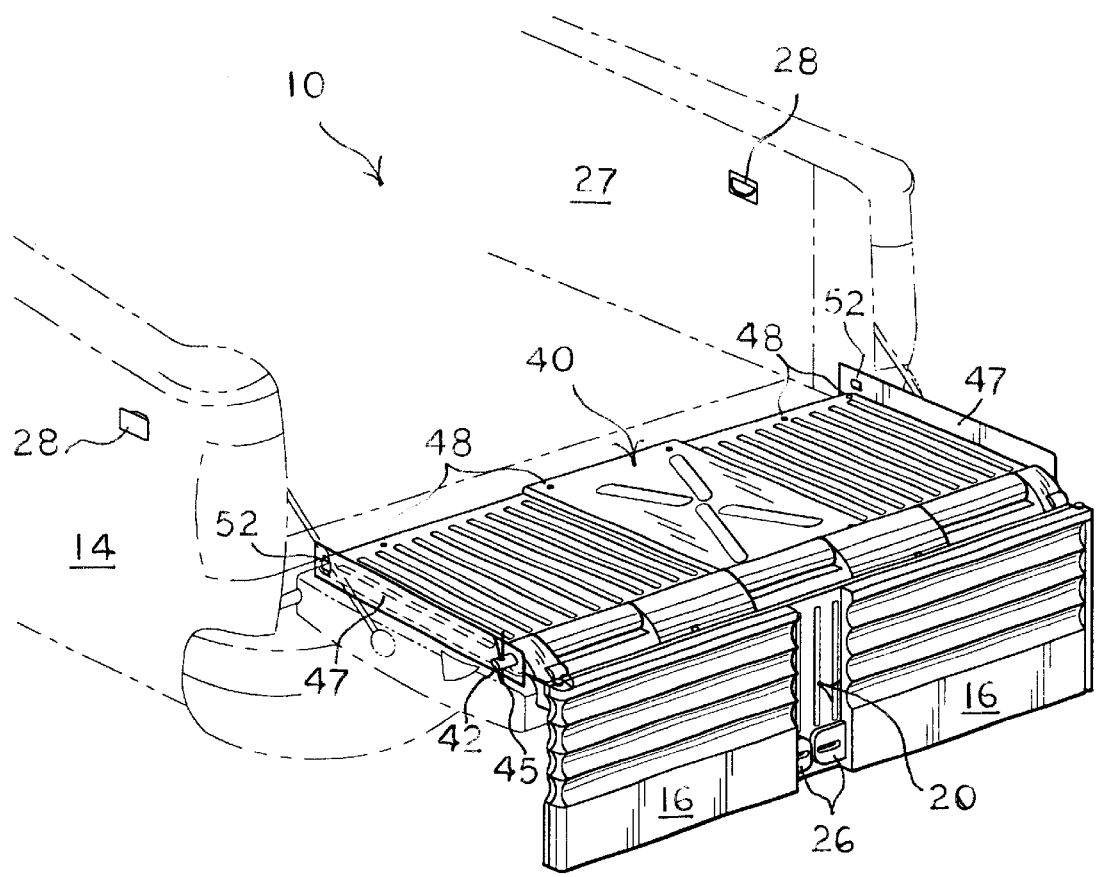
FIG. 2 is a perspective view of a folded truck bed extender rotated down from an open tailgate for loading the truck bed (shown in shadow).

In FIG. 2, the novel advantage of the truck bed extender apparatus 10 is illustrated with the tailgate 12 of the truck 14 down for loading or unloading cargo. The extender 10 has the side panel elements 16 released and folded inward. The apparatus 10 can be rotated downward 270° from the open position of the tailgate 12 for loading or unloading cargo.

The outer surface of the tailgate element 20 can be conveniently be covered with a rectangular plastic signboard holder due to the flat surface available for posting advertisement signs (not shown) and the like.

Exemplary dimensions for the truck bed extender apparatus 10 are as follows:

side panel elements (2) 16: 24 in. length, 18.5 in. height and 0.75 in. thick.

tailgate element 20: 60 in. length, 18.5 in. height and 1.75 in. thick.

tailgate platform element 40: 60 in. length, 20 in. height and 0.5 in. thick.

The side panel elements 16, the tailgate element 20 and the tailgate platform element 40 are preferably made of 0.25 in. thick polyethylene by a vacuum forming process.

It is to be understood that the present invention is not limited to the embodiment described above, but encompasses any and all embodiments within the scope of the following claims.

We claim:

1. A foldable truck bed extender apparatus comprising:
   a pair of rectangular side panel elements having apertured connecting lugs on one vertical outer edge and an apertured latch plate extending from an opposite vertical inner edge;

a rectangular tailgate element having lug receiving recesses on both vertical sides between a plurality of spaced connecting lugs, and a plurality of spaced apertured lugs on a horizontal side;

a rectangular platform element, commensurate in area to an existing tailgate of a truck bed, having a plurality of spaced apertured lugs for connection to the tailgate element;

right-angled brackets extending along and attached to opposite sides of said platform element, each of said brackets having a spring element for retaining said tailgate element against the platform element when the truck bed extender is folded for storage; and two short rods for removably connecting the pair of side panel elements to the tailgate element, and a long rod for removably connecting the tailgate element to the platform element to form the truck bed extender.

2. The foldable truck bed extender apparatus according to claim 1, wherein each of the pair of side panel elements is removably securable to inside surfaces of truck bed walls by a latch mechanism.

3. The foldable truck bed extender apparatus according to claim 2, wherein the latch mechanism comprises a key latch positionable on a bed wall of a pickup truck, the key latch cooperating with the apertured latch plate on the inner vertical edge of the side panel element.

4. The foldable truck bed extender apparatus according to claim 1, wherein the platform element has a plurality of apertures adapted for attachment to a tailgate of a truck by removable fasteners.

5. The foldable truck bed extender apparatus according to claim 1, including a pair of cylindrical rods with removable caps for connecting the side panel elements to the tailgate element to permit the side panel elements to be foldable and to lie flush against the tailgate element.

6. The foldable truck bed extender apparatus according to claim 1, wherein the tailgate element is rotatable at least 270° about the platform element between an up position in which the tailgate element defines a rear wall for holding cargo in the truck bed extension, and a down position for loading or unloading the truck.

7. The foldable truck bed extender apparatus according to, claim 1, wherein the tailgate element and the platform element are connected by a cylindrical rod having a head at one end and a removable fastener at the opposite end.

8. The foldable truck bed extender apparatus according to claim 7, wherein the removable fastener is a cotter pin.

9. The foldable truck bed extender apparatus according to claim 1, wherein the outside surface of the tailgate element is configured with a signboard holder for posting advertisement.

10. The foldable truck bed extender apparatus according to claim 1, wherein the side panel elements, the tailgate element and the platform element are made of polyethylene.

* * * * *